(12) United States Patent
Schulz et al.

(10) Patent No.: US 8,397,892 B2
(45) Date of Patent: Mar. 19, 2013

(54) CLUTCH SUPPORT

(75) Inventors: Winfried Franz-Xaver Schulz, Pulheim (DE); Thomas Martin, Pulheim (DE); Patrick Isele, Cologne (DE); Friedel Lauscher, Kreuzau-Drove (DE)

(73) Assignee: Getrag Ford Transmissions GmbH, Cologne (DE)

( * ) Notice: Subject to any disclaimer, the term of this patent is extended or adjusted under 35 U.S.C. 154(b) by 507 days.

(21) Appl. No.: 12/642,158

(22) Filed: Dec. 18, 2009

(65) Prior Publication Data

US 2010/0163364 A1  Jul. 1, 2010

(30) Foreign Application Priority Data

Dec. 30, 2008 (DE) .................. 10 2008 063 385

(51) Int. Cl.
*F16D 25/12* (2006.01)
(52) U.S. Cl. ..................... 192/115; 192/85.17
(58) Field of Classification Search .................. 192/115, 192/48.611, 85.17; 138/151
See application file for complete search history.

(56) References Cited

U.S. PATENT DOCUMENTS

| 2,202,909 A | 6/1940 | Hufferd et al. |
| 4,693,353 A * | 9/1987 | Kobayashi et al. ........ 192/85.41 |
| 7,246,692 B2 * | 7/2007 | Braford ................... 192/48.611 |
| 2005/0067251 A1 * | 3/2005 | Braford et al. ............ 192/70.12 |
| 2007/0131015 A1 * | 6/2007 | Matsumura et al. ............ 72/368 |

FOREIGN PATENT DOCUMENTS

| DE | 4239233 | 5/1994 |
| EP | 1316746 | 6/2003 |
| EP | 1316746 A1 | 6/2003 |
| EP | 1316746 B1 | 6/2003 |
| EP | 1568554 | 8/2005 |
| EP | 1568554 A1 | 8/2005 |
| EP | 1568554 B1 | 8/2005 |
| WO | 2007/051627 | 5/2007 |

* cited by examiner

*Primary Examiner* — Richard M. Lorence
(74) *Attorney, Agent, or Firm* — Schlee IP International, P.C.; Alexander R. Schlee

(57) ABSTRACT

A clutch support for supporting a clutch hub of a clutch such that the clutch hub is rotatable is described. The clutch hub comprises a flange that is fixable at clutch housing or the like; a substantially cylindrical element for receiving the clutch hub such that the clutch hub is rotatable; and a sleeve with at least one groove formed therein for providing at least one channel that allows oil to be supplied to the clutch through this channel. The sleeve is manufactured substantially without any chip removing machining action. This achieves the goal to provide a clutch support that can be manufactured in a simple manner and at comparatively low cost.

6 Claims, 3 Drawing Sheets

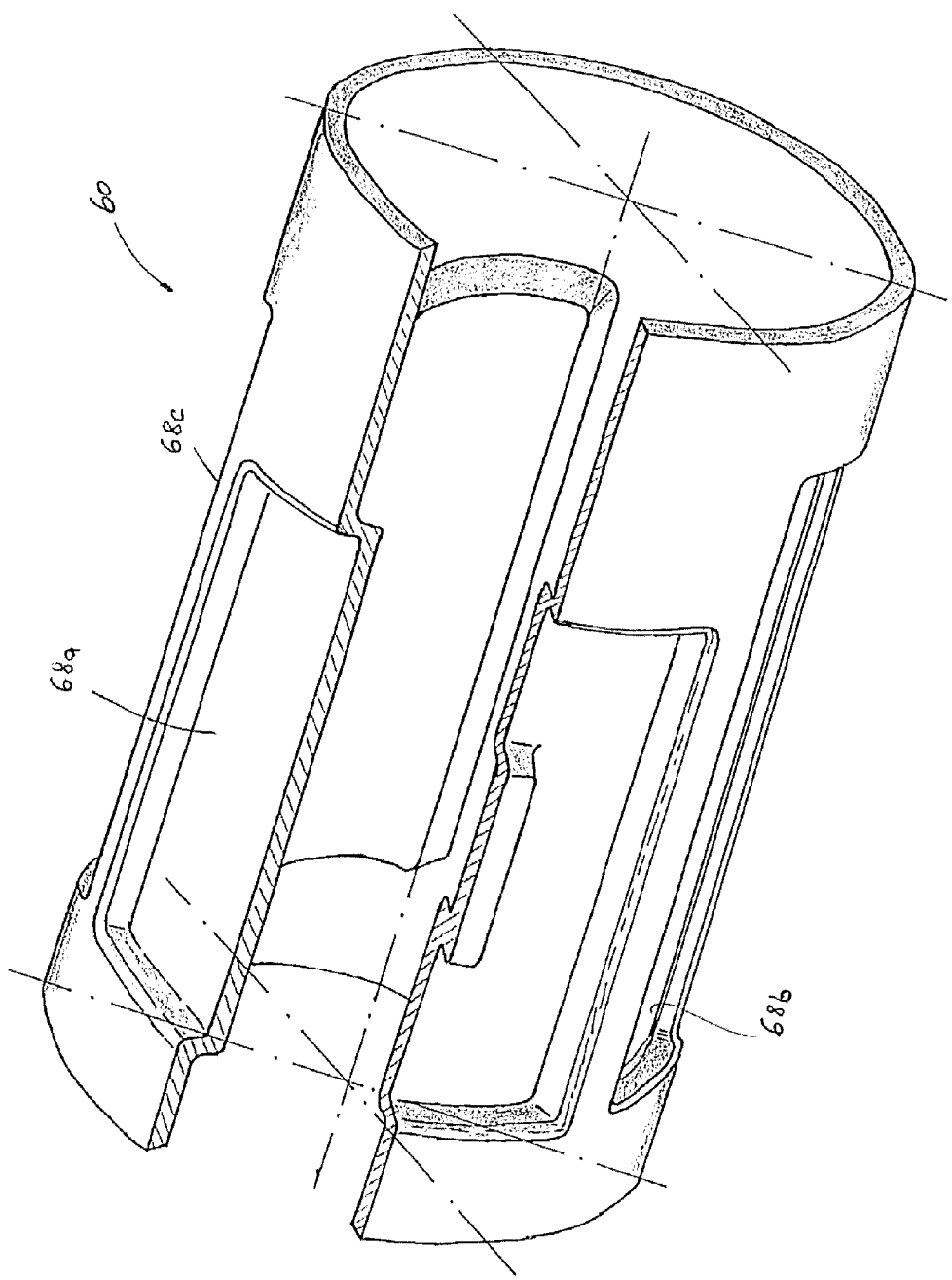

CLUTCH SUPPORT

CROSS REFERENCE TO RELATED APPLICATION

This application claims the priority right from the German patent application DE 102008063385.2 that was filed on Dec. 30, 2008, the content of which is herewith incorporated in its entirety by reference.

BACKGROUND OF THE INVENTION

The invention relates to clutch support for supporting a clutch hub of a clutch such that the clutch hub is rotatable, comprising a flange that is fixable at a clutch housing or the like, the clutch support comprising a substantially cylindrical element for receiving the clutch hub in a rotatable manner and comprising a sleeve with at least one groove formed therein for providing at least one channel that allows oil to be supplied to the clutch through this channel.

From the WO 2007/051627 A1 a clutch support is known supporting a rotatably mounted clutch hub of a clutch that comprises two friction clutches that can be actuated independently from each other. The friction clutches are so-called wet clutches requiring that both friction clutches are supplied with oil. The two friction clutches are actuated hydraulically. Therefore, in addition to supplying oil for cooling, the friction clutches have to be provided with pressurized hydraulic oil for actuating the friction clutches.

The clutch support of WO 2007/051627 A1 does not only support the clutch hub, but also supplies oil via the clutch hub to the friction clutches. For this purpose, the clutch support comprises a cylindrical element that is provided with a plurality of ring-shaped grooves. The ring-shaped grooves are in contact with different channels that are provided by grooves formed in a sleeve of the clutch support. The structure of this sleeve is relatively complex since separate channels that are separated from each other have to be formed within the sleeve for allowing to pressurize the two friction clutches independently from each other and independently from the cooling oil flow with pressurized hydraulic oil.

Due to the complex structure, the clutch support can only be manufactured at high cost. For example, for manufacturing of the sleeve, a forged blank has to be processed further by chip removing machining such as turning, milling, precision turning and grinding. This plurality of manufacturing steps in manufacturing the clutch support is very cost intensive.

SUMMARY OF THE INVENTION

It is therefore an object of the invention to provide a clutch support that can be manufactured in a simple manner and at comparatively low cost.

This object is achieved according to the invention by a clutch support for supporting a clutch hub of a clutch such that the clutch hub is rotatable, comprising a flange that is fixable at a clutch housing or the like; a substantially cylindrical element for receiving the clutch hub such that the clutch hub is rotatable; and a sleeve with at least one groove formed therein for providing at least one channel that allows oil to be supplied to the clutch through this channel; wherein the sleeve is manufactured substantially without any chip removing chip removing machining action.

DETAILED DESCRIPTION OF THE INVENTION

The clutch support according to the invention is characterized in that the sleeve is manufactured substantially without any chip removing machining action. The sleeve presses according to a preferred embodiment against the inner wall of the cylindrical element by a press fit and can be manufactured from at least one strip material that is rolled cylindrically or curled. In addition to the press fit also other options for connecting the sleeve with the cylindrical element are possible (for instance gluing).

The strip material may comprise such a length that it comprises in its cylindrically rolled state a diameter that matches the desired diameter of the sleeve, wherein the two ends of the curled strip material form a seam with each other that is either gap free or comprises a small gap and extends in axial direction of the sleeve. In this case, only one axial seam results from the curling process. However, it is also possible that the sleeve is formed by two half-shells manufactured by curling. In this case, the sleeve comprises two axial seams that are offset in a circumferential direction by 180 degrees if both half-shells are of the same size.

A connection between the two opposing ends of the curled strip material along the seam is not absolutely necessary if the sleeve attaches to the inner wall of the cylindrical element of the clutch support by a press fit. In this case, the seam is a simple butt joint where due to the rigid press fit of the sleeve within the cylindrical element the ends of the curled strip material cannot separate from each other.

According to a preferred embodiment, the two ends of the curled strip material are connected to each other along the seam. One preferred option is that one end of the curled strip material comprises at least one undercut portion while the other end comprises a recess portion matching the undercut portion, and the interlocking between the undercut portion and the recess receiving the undercut portion provides a positive interlocking in a circumferential direction. The undercut portion can for example be dovetail shaped, so that a dovetail connection between the ends of the curled strip material is created. Along the seam a plurality of undercut portions can be provided so that over the entire length of the sleeve a rigid connection between the opposing ends of the curled strip material is created.

Another option is that the opposing ends of the curled strip material are glued to each other or welded together. In the latter case, a finishing treatment of the weld seam maybe necessary if the sleeve has to rest against the inner wall of the cylindrical element in a flush or sealing manner. Such finishing treatment may comprise chip removing machining (such as for instance grinding). A clutch support having such a weld seam that was subjected to a finishing treatment should nevertheless be covered by the scope of protection claimed in claim 1 since the major shape of the sleeve comprising the formed-in grooves was manufactured without any chip removing machining steps and not by the finishing treatment.

The seam might extend along the bottom of the groove so that a weld seam connecting the ends of the curled material is positioned within the groove. If the groove extends over the entire axial length of the sleeve, no finishing treatment of the weld seam is necessary for securing that the sleeve with its outer circumferential face rests against the inner wall of the cylindrical element in a flush and sealing manner since the weld seam is offset towards the inside within the groove.

The sleeve may comprise an outer sleeve and an inner sleeve, wherein the outer sleeve and/or the inner sleeve is provided with punch outs for forming at least one groove. If for instance the outer sleeve comprises an elongated punch out, while the inner sleeve comprises a continuous circumferential face, in the assembled position of the sleeve a channel is formed between the inner wall of the cylindrical element and the inner sleeve of the sleeve.

The outer sleeve and inner sleeve can be interconnected by means of a press fit. Another preferred embodiment is that the inner sleeve and the outer sleeve are glued together. Also other connections are possible (for example welding).

For simple manufacturing of the outer sleeve, at first portions are punched out from the plane strip material. Thereafter, the outer sleeve is curled such as to receive its cylindrical shape.

The sleeve may also be integrally formed. For this purpose, parts of the strip material can be deep-drawn such that recesses or grooves are formed into the sleeve. After the deep drawing process the deep-drawn strip material is curled into a sleeve. One preferred alternative is hydroforming allowing to manufacture the outline of the sleeve from the strip material (sheet material) and curling it thereafter.

Hydroforming may also be applied to a sheet material having a thin wall so that a seamless sleeve may be manufactured directly.

In the alternative, the sleeve may also be manufactured as an injection molded part or a molded part. Preferred embodiments are made from plastic or aluminum (aluminum diecasting).

The flange and the cylindrical element of the clutch support may be manufactured separately and interconnected with each other along a seam. The connection at the seam location may for instance be achieved by gluing or creating a weld seam. It is further possible to interconnect the flange and the cylindrical element via a press fit with each other.

The flange and/or the cylindrical element can also be manufactured without chip removing machining. For example, the cylindrical element may be a tube having a thin wall that has been curled from a strip material.

The sleeve, the flange and/or the cylindrical element may also be subjected to a finishing treatment in the form of chip removing machining. This finishing treatment allows to remove sharp edges, but the overall manufacturing of these parts is still deemed to be in a non-machining fashion since it does not change the shape of the individual component parts in any substantial manner.

The invention is described in the following in more detail by referring to the embodiments.

BRIEF DESCRIPTION OF THE DRAWINGS

In the drawings show:

FIG. 3 a sleeve of a clutch support according to a second embodiment of the present invention.

DETAILED DESCRIPTION OF THE DRAWINGS

Figure 1:
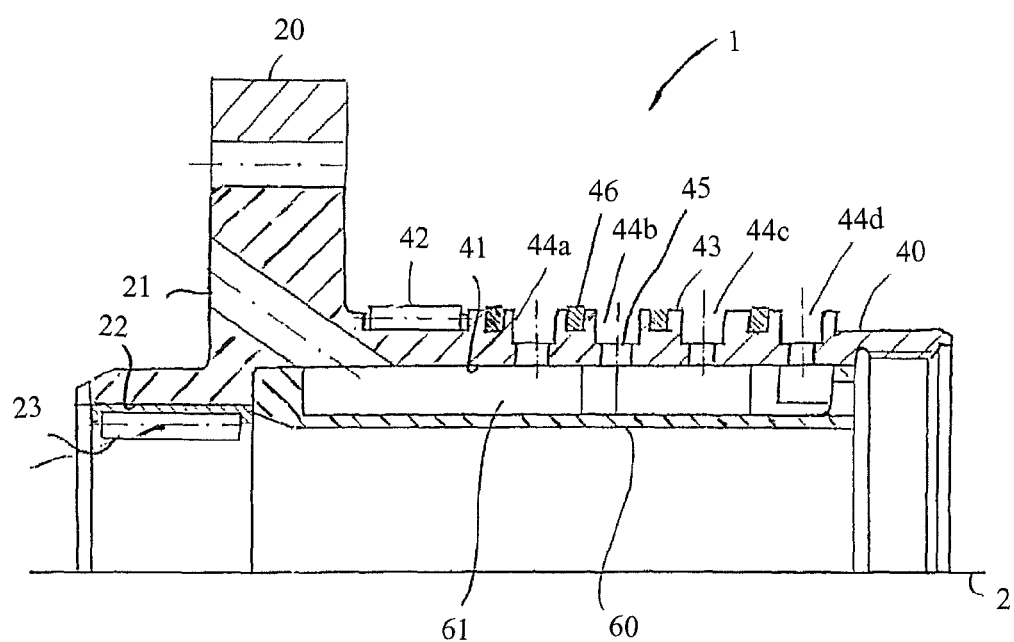
FIG. 1 a longitudinal section of an embodiment of the clutch support according to the present invention.

FIG. 1 shows a clutch support that is denoted by reference numeral 1 in its entirety. The clutch support 1 provides a bearing so as to rotatably support a clutch hub of a clutch. The clutch hub as well as the clutch are not shown in FIG. 1. Further, the clutch support 1 provides oil lubrication for the clutch.

The clutch is designed as a dual clutch comprising two friction clutches. The friction clutches can be actuated hydraulically and independently from each other. Further, the friction clutches are wet clutches that are cooled with oil.

The clutch support 1 comprises a flange 20, a cylindrical element 40 and a sleeve 60 that is flush with an inner cylindrical wall 41 of the cylindrical element 40. The flange 20 and the cylindrical element 40 are integrally formed. The non-shown clutch hub is supported on the cylindrical element 40 via a radial needle bearing 42, and the clutch hub can be rotated around a rotational axis 2. On its outer side 43 the cylindrical element 40 comprises ring-shaped grooves as 44a to 44d that are connected via holes 45 with the various grooves or recesses 61 in the sleeve 60. The grooves 61 are in connection with oil feeding lines, one of which has been shown in FIG. 1 and denoted with reference numeral 21. The flange 20 does in addition to having the function of securing oil feeding also have the function of fixing the clutch support 1 and a clutch housing or the like.

The various ring-shaped grooves 44a to 44d are in the assembled state of the clutches connected to channels in the non-shown clutch hub. Seals 46 provided between the ring-shaped grooves 44a to 44c are sealing the ring-shaped grooves with respect to each other. While via two of the four ring-shaped grooves clutch actuating cylinders of the clutch are subjected to pressurized oil, the other two ring-shaped grooves are provided for cooling the friction clutches of the clutch with oil.

As already discussed, the sleeve 60 is in contact with the inner cylindrical wall 41 of the cylindrical element 40 in a flush manner. The various grooves 61 in the sleeve 60 do therefore form in connection with the inner wall 21 a plurality of channels between the sleeve 60 and the cylindrical element 40, allowing oil to be fed through the oil feeding lines 21 into the ring-shaped grooves 44a to 44d.

FIG. 1 shows at the cylindrical inner wall 22 of the flange 20 a further radial needle bearing 23 supporting a here non-shown shaft connecting the clutch with a transmission.

Figure 2:
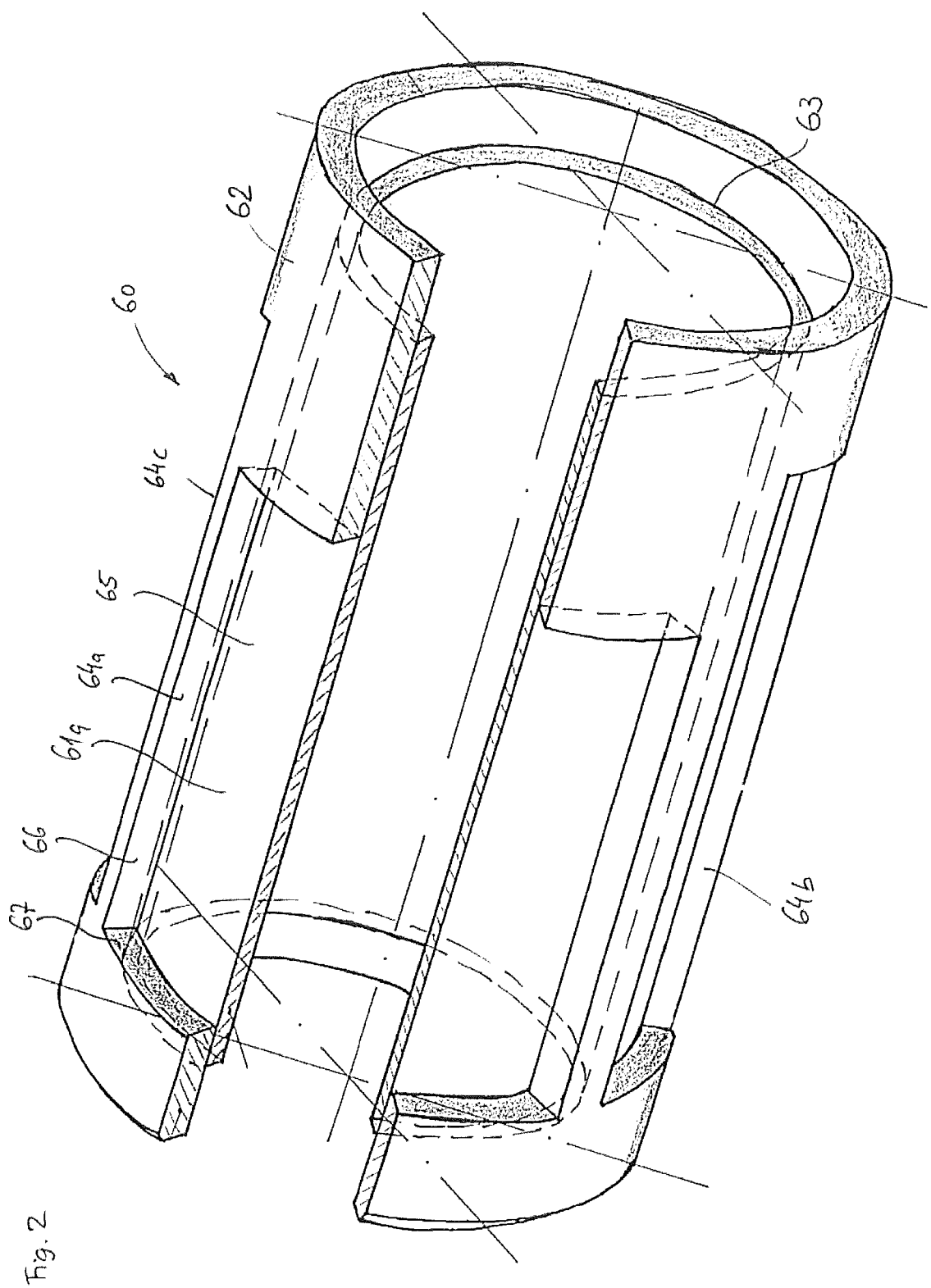
FIG. 2 a perspective view of a sleeve of the clutch support according to a first embodiment.

The FIGS. 2 and 3 show a perspective view of different embodiments of the sleeve 60 resting against the inner wall 41 of the cylindrical element 40.

The sleeve shown in FIG. 2, also denoted with reference numeral 60, comprises an outer sleeve 62 and an inner sleeve 63. The outer sleeve 62 as well as the inner sleeve 63 are manufactured from a plane strip material that was bent by a curling for forming the cylindrical shape of the sleeves 62, 63. The outer sleeve 62 comprises a plurality of punch outs 64a, 64band 64c that have been punched out from the plane strip material prior to the curling process. When the sleeves are stuck together as shown in FIG. 2, for instance the punch out 64a forms in connection with the inner sleeve 63 grooves 61a, wherein the groove bottom 65 is formed by the outer cylindrical face of the sleeve 63. The groove walls 66, 67 at the lateral groove walls are the punched out edges that have been created due to punching out the punch out 64a in the outer sleeve 62.

The punch outs 64a, 64b, 64c are provided at the circumference of the outer sleeve 62 and spaced apart from each other and comprise different axial lengths. Therefore, it is possible to create the desired channels between a particular one of the oil supply lines 21 and a particular one of the holes 45 at the outer face of the cylindrical element 40.

FIG. 3 shows a sleeve 60 that is integrally formed. The sleeve 60 according to FIG. 3 is also made from a strip material that has been curled for creating the basic cylindrical shape. Prior to the curling process the strip material has been subjected to a deep drawing process for creating deep-drawn recesses 68a, 68b and 68c in the material of the sleeve 60. These deep-drawn recesses 68 provide the grooves 61 that form in connection with the inner face 41 of the cylindrical element 40 the channels for the oil supply.

LIST OF REFERENCE NUMERALS 1 clutch support
2 rotational axis
20 flange
21 oil supply lines
22 inner face
23 radial needle bearing
40 cylindrical element
41 inner wall
42 radial needle bearing
43 outer face 44 ring-shaped groove
45 hole
46 seal
60 sleeve
61 groove
62 outer sleeve
63 inner sleeve
64 punch out
65 groove bottom
66 edge
67 edge
68 deep-drawn recess

What is claimed is:

1. A clutch support for supporting a clutch hub of a clutch such that the clutch hub is rotatable, comprising:
   a flange that is fixable at a clutch housing or the like;
   a substantially cylindrical element for receiving the clutch hub such that the clutch hub is rotatable; and
   a sleeve with at least one groove formed therein for providing at least one channel that allows oil to be supplied to the clutch through this channel; wherein the sleeve comprises an outer sleeve and an inner sleeve, wherein at least one of the outer sleeve and the inner sleeve comprise at least one punch out portion for forming the at least one groove.

2. The clutch support according to claim 1, wherein the sleeve rests against an inner wall of the cylindrical element.

3. The clutch support according to claim 1, wherein the sleeve is press-fitted into the cylindrical element such that it presses against the inner wall of the cylindrical element.

4. The clutch support according to claim 1, wherein the sleeve is made from at least one strip material that has been rolled cylindrically or curled.

5. The clutch support according to claim 4, wherein two ends of the curled strip material are opposed to each other and form a gap therebetween that extends in an axial direction of the sleeve.

6. The clutch support according to claim 1, wherein at least one of the flange and the cylindrical element are manufactured without any chip removing machining action.

* * * * *